No. 640,460. Patented Jan. 2, 1900.
A. M. FERGUSON.
NON-PUNCTURABLE WHEEL TIRE.
(Application filed Mar. 2, 1898.)
(No Model.)
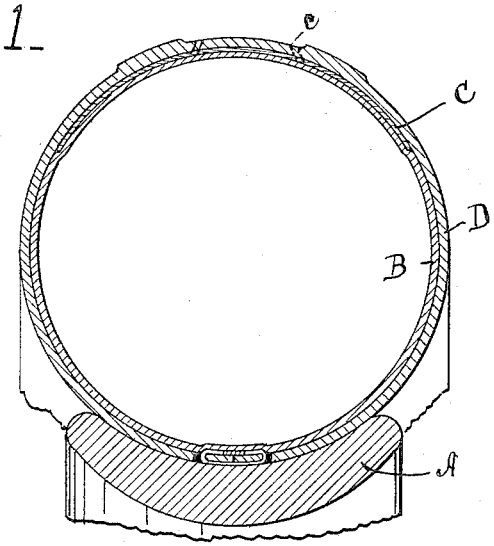
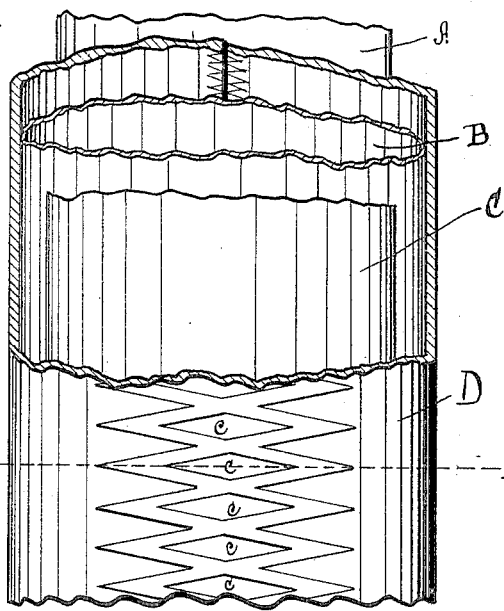
Witnesses.
A. R. Selden.
S. M. Jenkins.
Inventor.
Albert M. Ferguson
H. N. Jenkins
his Attorney.

United States Patent Office.

ALBERT M. FERGUSON, OF SYRACUSE, NEW YORK, ASSIGNOR TO THE ROCHESTER NON-PUNCTURABLE TIRE COMPANY, OF ROCHESTER, NEW YORK.

NON-PUNCTURABLE WHEEL-TIRE.

SPECIFICATION forming part of Letters Patent No. 640,460, dated January 2, 1900.

Application filed March 2, 1898. Serial No. 672,305. (No model.)

*To all whom it may concern:*

Be it known that I, ALBERT M. FERGUSON, a citizen of the United States, residing at Syracuse, in the county of Onondaga and State of New York, have invented new and useful Improvements in Non-Puncturable Wheel-Tires, of which the following is a specification.

This invention relates to a non-puncturable tire for bicycles and other wheels having concave rims.

The nature of my invention will be readily understood by referring to the accompanying drawings, whereon—

Figure 1 represents a cross-section of an ordinary bicycle-wheel rim provided with my non-puncturable tire, and Fig. 2 a section of said tire and wheel-rim as viewed from the outer edge thereof.

On the drawings the letter A designates the wheel-rim, over which the tire is sprung and held by cement or other adhesive material.

My improved tire is composed of an annular rubber tube B, over the outer diameter of which is a steel or other light metallic concavo-convex rim C, which is made to conform to the size of the rubber tube over which it is intended to fit.

A feature of my invention is to provide the metallic rim C with a circle of offsets or projections *c* of any desired shape. On the drawings they are shown as of diamond shape at right angles to the wheel proper, the metal between the projections and at each side thereof having a smooth uniform surface, so as to prevent injury to the material in contact therewith. A flexible casing D, preferably of rubber and cloth combined, is employed to inclose the rubber tube and metallic rim and is laced or otherwise secured over same before applying the tube on the wheel-rim.

In the construction of the wheel-casing the tread portion thereof is pressed or otherwise provided with an embossed portion to fit over the projections of the metallic rim C. As the raised portions of the casing wear the projections of the rim C become exposed; but otherwise the said casing is unimpaired, the material between the projections remaining intact and still retaining its efficiency.

From the above description it will be seen that while the outer casing may be damaged by travel over rough roads or cutting material the inner rubber tube will be thoroughly protected by the concavo-convex rim C.

Having described my invention, what I claim as new, and desire to secure by Letters Patent, is—

In combination with a pneumatic tire, an annular metal concavo-convex rim adapted to fit thereon, the said rim provided around the center of its circumference with a series of projections, the metal between the projections and at each side thereof having a smooth uniform surface, as described, a flexible casing having an embossed tread adapted to fit over the projections of the concavo-convex rim, and a lacing whereby the pneumatic tire, concavo-convex rim and the outer casing are secured together and thus adapted for application to the concave rim of a wheel, substantially as set forth.

In testimony whereof I have hereunto set my hand this 2d day of March, A. D. 1898.

ALBERT M. FERGUSON.

Witnesses:
 H. N. JENKINS,
 S. M. JENKINS.